US011023451B2

(12) United States Patent
Shibamura

(10) Patent No.: US 11,023,451 B2
(45) Date of Patent: Jun. 1, 2021

(54) CHANGE DETECTION APPARATUS, MAINTENANCE AND MANAGEMENT SYSTEM, CHANGE DETECTION METHOD, PROGRAM, AND RECORDING MEDIUM

(71) Applicant: Yokogawa Electric Corporation, Tokyo (JP)

(72) Inventor: Junpei Shibamura, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 275 days.

(21) Appl. No.: 16/351,491

(22) Filed: Mar. 12, 2019

(65) Prior Publication Data

US 2019/0286626 A1    Sep. 19, 2019

(30) Foreign Application Priority Data

Mar. 19, 2018   (JP) .............................. JP2018-051695

(51) Int. Cl.
*G05B 19/042*   (2006.01)
*G06F 16/22*    (2019.01)
*G06F 16/23*    (2019.01)
*G06F 16/93*    (2019.01)

(52) U.S. Cl.
CPC ....... *G06F 16/2358* (2019.01); *G05B 19/042* (2013.01); *G06F 16/22* (2019.01); *G06F 16/93* (2019.01); *G05B 2219/23335* (2013.01); *G05B 2219/25101* (2013.01); *G05B 2219/32235* (2013.01)

(58) Field of Classification Search
CPC ...... G06F 16/2358; G06F 16/22; G06F 16/93; G05B 19/042; G05B 2219/25101; G05B 2219/23335; G05B 2219/32235
See application file for complete search history.

(56) References Cited

U.S. PATENT DOCUMENTS

| 8,122,434 | B2 | 2/2012 | Kostadinov |
| 10,126,921 | B2 | 11/2018 | Furihata |
| 2006/0092039 | A1 | 5/2006 | Saito |

(Continued)

FOREIGN PATENT DOCUMENTS

| DE | 102010027963 A1 | 10/2011 |
| JP | 2007124206 A | 5/2007 |

(Continued)

OTHER PUBLICATIONS

Extended European Search Report for counterpart European Application No. 19163764.4, issued by the European Patent Office dated Jul. 29, 2019.

(Continued)

*Primary Examiner* — Jorge A Casanova

(57) ABSTRACT

Recently, there is a desire to accurately share information concerning the presence or absence and content of a change in a setting parameter value. Provided is a change detection apparatus including a parameter acquiring section that acquires a value of at least one setting parameter of a field device, at predetermined time intervals; a change detecting section that detects whether the value of the setting parameter has been changed; and a change information output section that outputs change information, in response to a change in the value of the setting parameter having been detected.

13 Claims, 12 Drawing Sheets

(56) References Cited

U.S. PATENT DOCUMENTS

| | | | |
|---|---|---|---|
| 2008/0046104 A1 | 2/2008 | Van Camp | |
| 2011/0093098 A1 | 4/2011 | Kostadinov | |
| 2015/0355631 A1* | 12/2015 | Oohiai | G05B 19/042 |
| | | | 700/19 |
| 2017/0017231 A1* | 1/2017 | Toyota | G08C 17/02 |
| 2017/0300027 A1* | 10/2017 | Oyama | F04B 17/03 |
| 2019/0025786 A1* | 1/2019 | Park | G06F 16/9024 |

FOREIGN PATENT DOCUMENTS

| | | |
|---|---|---|
| JP | 2010003190 A | 1/2010 |
| JP | 2013137704 A | 7/2013 |
| JP | 2015109011 A | 6/2015 |

OTHER PUBLICATIONS

Office Action issued for counterpart Japanese Application No. 2018-051695, issued by the Japan Patent Office dated Jun. 2, 2020 (drafted on May 29, 2020).

* cited by examiner

| MODEL NAME | PRODUCT NAME | SETTING PARAMETER IDENTIFICATION INFORMATION | | | | SUPPLEMENTARY INFORMATION (ADVANTAGE FOR THE USER) |
|---|---|---|---|---|---|---|
| | | No | CODE | NAME | EXPLANATION | |
| AAA010 | DIFFERENTIAL PRESSURE TRANSFER MACHINE | 1 | J10 | ZERO ADJ | AUTOMATIC ZERO-ADJUSTMENT | KNOWN THAT ZERO-ADJUSTMENT HAS OCCURRED |
| | | 2 | S00 | INITIAL | PARAMETER INITIALIZATION | KNOWN THAT INITIALIZATION HAS OCCURRED |
| | | 3 | C10 | TAG NO. | TAG NAME | KNOWN WHICH TAG HAS BEEN ALLOCATED TO DEVICE |
| | | ... | | | | |
| | TEMPERATURE TRANSFER MACHINE | 10 | D23 | OUTPUT X% | TEST OUTPUT % SET, CHANGED WHEN CHECKING AMP CONDITION | KNOWN THAT INSPECTION HAS OCCURRED |
| | | ... | | | | |
| AAA020 | | | | | | |
| BBB010 | ELECTROMAGNETIC FLOW METER | 1 | B15 | DAMPING | DAMPING TIME | KNOWN THAT DAMPING COEFFICIENT ADJUSTMENT HAS OCCURRED |

FIG. 3

| DEVICE ID | SERIAL NUMBER | TAG NAME | MODEL NAME | MANUFAC- TURER NAME | PRODUCT NAME | SETTING PARAMETER | SPECIFICA- TION INFORMATION | DOCUMENT NUMBER |
|---|---|---|---|---|---|---|---|---|
| ID0001 | 91RA33333 | PT-001 | AAA010 | Yokogawa | DIFFERENTIAL PRESSURE TRANS- FER MACHINE | ... | ... | No.AAAA |
| ID0002 | 91RB44444 | TT-003 | AAA020 | Yokogawa | TEMPERATURE TR- ANSFER MACHINE | ... | ... | ... |
| ID0003 | 91RC55555 | FM-002 | BBB010 | Yokogawa | ELECTROMAGNETIC FLOW METER | ... | ... | No.BBBB |
| ID0004 | 91RD66666 | FM-008 | DP | Vendor A | | ... | ... | ... |
| ID0005 | 91RE77777 | PT-011 | FLO | Vendor B | | ... | ... | ... |
| | | | | ... | | | | |

| SETTING PARAMETER | MAINTENANCE WORK |
|---|---|
| RANGE | PROCESS CONDITION CHANGE |
| DAMPING | TUNING |
| ⋮ | |

*FIG. 6*

FIELD DEVICE LIST

| SERIAL NUMBER | TAG NAME | MODEL NAME | MANUFAC-TURER NAME | PRODUCT NAME | SETTING PARAMETER | SPECIFICA-TION INFORMATION | DOCUMENT NUMBER |
|---|---|---|---|---|---|---|---|
| 91RA33333 | PT-001 | AAA010 | Yokogawa | DIFFERENTIAL PRESSURE TRANSFER MACHINE | ... | ... | No.AAAA |
| 91RB44444 | TT-003 | AAA020 | Yokogawa | TEMPERATURE TRANSFER MACHINE | ... | ... | ... |
| 91RC55555 | FM-002 | BBB010 | Yokogawa | ELECTROMAGNETIC FLOW METER | ... | ... | No.BBBB |
| 91RD66666 | FM-008 | DP | Vendor A | | ... | ... | ... |
| 91RE77777 | PT-011 | FLO | Vendor B | | ... | ... | ... |
| ... | | | | | | | |

*FIG. 10*

FIELD DEVICE DETAILS

| DEVICE ID | SERIAL NUMBER | TAG NAME | MODEL NAME | MANUFAC- TURER NAME | PRODUCT NAME | SETTING PARAMETER | SPECIFICA- TION INFORMATION | DOCUMENT NUMBER |
|---|---|---|---|---|---|---|---|---|
| ID0003 | 91RC55555 | FM-002 | BBB010 | Yokogawa | ELECTROMAGNETIC CURRENT METER | ... | ... | ... |

PRODUCT INFORMATION | DOCUMENT

SHIPPING DEVICE TAG ...

STATUS  Available

DEVICE ID ...

Production date  2005-3-16

PROTOCOL  HART

REVISION ...

SETTING PARAMETER HISTORY

| PARAMETER NAME | PREVIOUS VALUE | CURRENT VALUE |
|---|---|---|
| DeviceState | Online | Online |
| DeviceTag | DSTag | DSTag |
| DevicePath | PBRRMP2-0612... | PBRRMP2-0612... |
| Protocol | FoundationFieldbus | FoundationFieldbus |
| ManufactureID | | |
| DeviceType | 0x3 | 0x3 |
| DeviceRevision | 0x3 | 0x3 |
| TagDesc | 0x000000 | samplevalue12 |
| ModeBlkactual | 0x000000 | samplevalue13 |
| BlockErr | 0x000000 | samplevalue14 |

*FIG. 11*

CHANGE DETECTION APPARATUS, MAINTENANCE AND MANAGEMENT SYSTEM, CHANGE DETECTION METHOD, PROGRAM, AND RECORDING MEDIUM

The contents of the following Japanese patent application(s) are incorporated herein by reference:
2018-051695 filed in JP on Mar. 19, 2018.

BACKGROUND

1. Technical Field

The present invention relates to a change detection apparatus, a maintenance and management system, a change detection method, a program, and a recording medium.

2 Related Art

Conventionally, in a facility such as a plant, the site where field devices are installed is distanced from the management room, instrument room, and the like (see Patent Document 1, for example), and therefore it is conceivable that when a change in a setting parameter value of a field device is made by an on-site worker, information concerning the occurrence and content of this change is not correctly shared with a manager.
Patent Document 1: Japanese Patent Application Publication No. 2006-157865

In recent years, there is a demand for information concerning the occurrence and content of a change in a setting parameter value to be accurately shared.

SUMMARY

Therefore, in order to solve the above problem, according to a first aspect of the present invention, provided is a change detection apparatus. The change detection apparatus may comprise a parameter acquiring section that acquires a value of at least one setting parameter of a field device, at predetermined time intervals. The change detection apparatus may comprise a change detecting section that detects whether the value of the setting parameter has been changed. The change detection apparatus may comprise a change information output section that outputs change information, in response to a change in the value of the setting parameter having been detected.

The change information output section may transmit the change information to a maintenance and management apparatus including a device registry that stores unique device information and the value of the setting parameter for each of a plurality of field devices, among which each field device is the field device.

The change detection apparatus may further comprise a detection target list acquiring section that acquires a detection target list designating the setting parameter to be a change detection target, among a plurality of setting parameters of the field device. The parameter acquiring section may acquire the value of the setting parameter included in the detection target list.

The change detection apparatus may further comprise a setting parameter selecting section that selects the setting parameters to be the change detection targets based on a frequency of change of each of the plurality of setting parameters.

The change detecting section may, in response to a newly acquired value of the setting parameter not being the same as a previously acquired value of the setting parameter, detect that the value of the setting parameter has been changed.

The parameter acquiring section may, in response to a change having been detected in the value of the setting parameter, further acquire a value of a related setting parameter that is related to the setting parameter for which this change was detected. The change information output section may output the change information including the acquired value of the related setting parameter.

The parameter acquiring section may, in response to a change having been detected in the value of any setting parameter that is a change detection target, further acquire values of a plurality of non-target setting parameters that are not change detection targets. The change information output section may output the change information including the acquired values of the plurality of non-target setting parameters.

The change detection apparatus may further comprise a non-detection information output section that, in response to the field device being undetectable and the parameter acquiring section being unable to acquire the value of the setting parameter from the field device, outputs non-detection information indicating that the field device is not detected.

The parameter acquiring section may acquire the unique device information and the value of the setting parameter of a new field device that is newly connected to a network. The change information output section may transmit to the maintenance and management apparatus a registration request for registering the unique device information and the value of the setting parameter of the new field device in the device registry.

According to a second aspect of the present invention, provided is a maintenance and management system. The maintenance and management system may comprise the change detection apparatus according to the first aspect. The maintenance and management system may comprise a maintenance and management apparatus that includes a device registry storing unique device information and the value of the setting parameter for each of a plurality of field devices, among which each field device is the field device, and receives the change information output by the change detection apparatus.

The maintenance and management apparatus may include a registration request receiving section that receives from the change detection apparatus a registration request for registering, in the device registry, the unique device information and the value of the setting parameter of a new field device that is newly connected to a network. The maintenance and management apparatus may include a device registering section that, in response to receiving the registration request, registers the new field device in the device registry.

The maintenance and management apparatus may include a searching section that searches a document database for a document relating to the field device, using the unique device information of the field device. The maintenance and management apparatus may include a document adding section that adds the document found by the search to the device registry in association with the field device.

According to a third aspect of the present invention, provided is a change detection method. The change detection method may comprise acquiring a value of at least one setting parameter of a field device, at predetermined time intervals. The change detection method may comprise detecting whether the value of the setting parameter has been changed. The change detection method may comprise outputting change information, in response to a change in the value of the setting parameter having been detected.

According to a fourth aspect of the present invention, provided is a program. The program may cause a computer to function as a parameter acquiring section that acquires a value of at least one setting parameter of a field device, at predetermined time intervals. The program may cause the computer to function as a change detecting section that detects whether the value of the setting parameter has been changed. The program may cause the computer to function as a change information output section that outputs change information, in response to a change in the value of the setting parameter having been detected.

According to a fourth aspect of the present invention, provided is a recording medium storing thereon a program. The program may cause a computer to function as a parameter acquiring section that acquires a value of at least one setting parameter of a field device, at predetermined time intervals. The program may cause the computer to function as a change detecting section that detects whether the value of the setting parameter has been changed. The program may cause the computer to function as a change information output section that outputs change information, in response to a change in the value of the setting parameter having been detected.

The summary clause does not necessarily describe all necessary features of the embodiments of the present invention. The present invention may also be a sub-combination of the features described above.

BRIEF DESCRIPTION OF THE DRAWINGS

FIG. 3 shows a detection target list.

FIG. 5 shows the device registry.

FIG. 6 shows estimation rules.

FIG. 10 shows an example of a display screen of the maintenance and management apparatus.

FIG. 11 shows another example of a display screen of the maintenance and management apparatus.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

(1. Configuration of the Maintenance and Management System)

Figure 1:
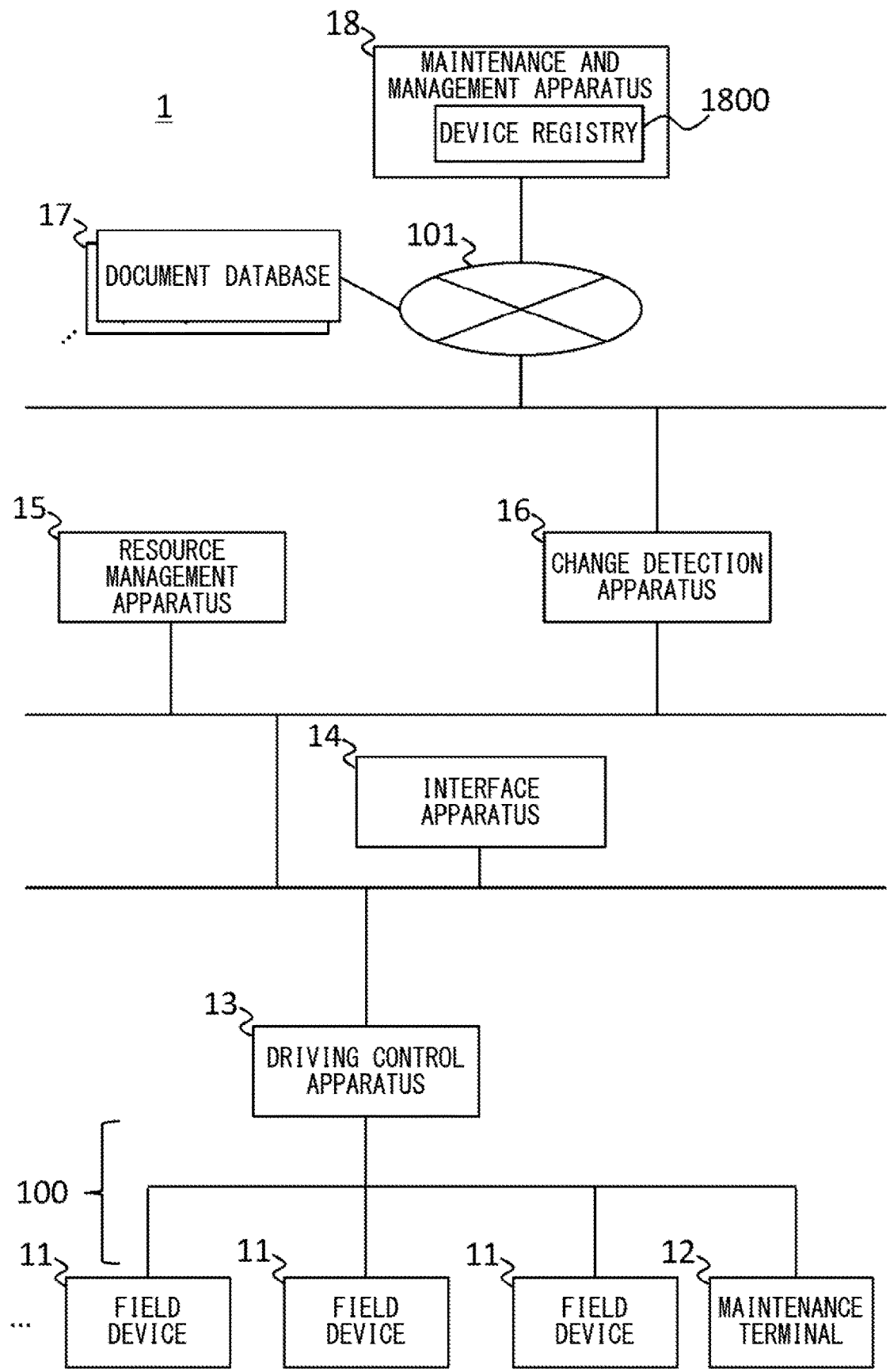
FIG. 1 shows the maintenance and management system according to the present embodiment.

FIG. 1 shows a maintenance and management system 1 according to the present embodiment. The maintenance and management system 1 is used to perform maintenance and management of field devices 11 installed in a facility such as a plant, and includes a plurality of field devices 11, a maintenance terminal 12, a driving control apparatus 13, an interface apparatus 14, a resource management apparatus 15, a change detection apparatus 16, one or more document databases 17, and a maintenance and management apparatus 18. Here, the plant or the like includes, for example, a factory facility, machinery facility, production facility, power generation facility, storage facility, or facility at a well for extracting oil, natural gas, or the like. As an example in the present embodiment, each field device 11 and the maintenance terminal 12 may be arranged at the site where processing is performed in the facility. For example, at the site, there are pipes through which fluid under measurement flows, flow meters that are installed in the pipes and measure the flow rate of the fluid, and the like. On the other hand, the driving control apparatus 13, the interface apparatus 14, the resource management apparatus 15, and the change detection apparatus 16 may be arranged in a management room, instrument room, or the like at the facility. The document database 17 may be arranged outside of the facility. The maintenance and management apparatus 18 may be arranged in the management room, instrument room, or the like in the facility, or may be arranged outside of the facility.

(1-1. Field Devices)

The plurality of field devices 11 are instruments, machines, or apparatuses, and may be sensors that measure physical quantities such as pressure, temperature, pH, velocity, or flow rate in the processing performed in the facility, or may be actuators such as valves, pumps, fans, or motors that control any one of these physical quantities. Each field device 11 among the plurality of field devices 11 may be a different type, or at least some, e.g. 2 or more, of the field devices 11 may be the same type. Each field device 11 may have the same manufacturer, or a different manufacturer.

The field devices 11 may be connected to the driving control apparatus 13 in a wired or wireless manner, via the control network 100. Communication in the control network 100 may be digital communication or may be hybrid communication in which a digital signal is superimposed on an analog signal (4 mA to 20 mA signal or the like), and the speed may be approximately 1000 bps to 10000 bps (e.g. 1200 bps or 2400 bps). The communication within the control network 100 may be performed using a wireless communication protocol of the ISA (International Society of Automation), for example, and may be performed using ISA 100, HART (Highway Addressable Remote Transducer) (Registered Trademark), BRAIN (Registered Trademark), FOUNDATION Fieldbus, PROFIBUS, or the like, for example.

Each field device 11 may include unique identification information (also referred to as unique device information) and settable parameter values (also referred to as setting parameter values). The unique device information is information for uniquely identifying a field device, and as an example in the present embodiment, may be at least one of a serial number provided to the field device 11 by the communication protocol (e.g. HART), a serial number set by a manufacturer of the field device 11, and a device ID.

(1-2. Maintenance Terminal)

The maintenance terminal 12 accesses the setting parameters of the field devices 11, and references, sets, and changes the setting parameter values, for example. The maintenance terminal 12 may be a handheld terminal (HHT) (e.g. a smartphone or tablet PC) that is carried by an on-site worker, or may be a desktop PC. If the maintenance terminal 12 is a handheld terminal, the maintenance terminal 12 may be connected in an attachable/detachable manner to the field device 11.

In addition to having the setting parameters of the field devices 11 changed using the maintenance terminal 12, the field devices 11 may be attached or detached to the control network 1 an may be stopped from operating to undergo maintenance, by an on-site worker maintenance. Conventionally, it is necessary for the on-site worker to notify a manager (e.g. the manager of any one of maintenance, stocking (inventory), and purchasing) about the content of such work either verbally or in writing, for example, and there are cases where the work content is not shared with the manager due to the on-site worker forgetting to provide notification or the content of the notification being incorrect.

(1-3. Driving Control Apparatus)

The driving control apparatus 13 controls the processing of each field device 11 by communicating with the field device 11. For example, the driving control apparatus 13 acquires a process value from a field device 11 that is a sensor, and drives a field device 11 that is an actuator. The driving control apparatus 13 may supply the interface apparatus 14 with the process value, and may receive a target value for this process value from the interface apparatus 14. As an example in the present embodiment, one driving control apparatus 13 is provided to the maintenance and management system 1 to control all of the field devices 11, but instead, a plurality of driving control apparatuses 13 may be provided to perform distributed control of respective sub-groups of the field devices 11. The driving control apparatus 13 may be an FCS (Field Control Station), for example.

(1-4. Interface Apparatus)

The interface apparatus 14 provides an interface between the manager and the facility. The interface apparatus 14 may control processing via the driving control apparatus 13, in response to being manipulated by the manager. For example, the interface apparatus 14 may receive a process value from the driving control apparatus 13 and supply the driving control apparatus 13 with a target value for this process value. Furthermore, the interface apparatus 14 may change a setting parameter value of a field device 11 via the driving control apparatus 13. The interface apparatus 14 may be an HIS (Human Interface Station), for example, and may be formed by a PC or the like.

(1-5. Resource Management Apparatus)

The resource management apparatus 15 performs online monitoring and centralized management in the facility. For example, the resource management apparatus 15 may manage the information of the field devices 11 (e.g. the setting parameter values) acquired by the driving control apparatus 13. The resource management apparatus 15 may share data relating to the field devices 11 with the change detection apparatus 16. The resource management apparatus 15 may be formed by a PC or the like, for example, (1-6. Change Detection Apparatus)

The change detection apparatus 16 acquires the setting parameter values of the field devices 11 and detects the presence or absence of a change. The change detection apparatus 16 may output change information to the maintenance and management apparatus 18, in response to there being a change. The change detection apparatus 16 may be a CCD (Configuration Change Detector), for example, and may be formed by a PC or the like or realized by cloud computing. The change detection apparatus 16 may be connected to another configuration via a firewall, not shown in the drawings.

(1-7. Document Database)

Each document database 17 stores the model name of a field device 11 in association with a document relating to this field device 11. The document may be a file of a digitized document, or may be a combination of a save destination (URL name or the like) of such a file and a file name. The document file may be an image file or a text file of specifications, a manual, or an inspection report of the field device 11. The document database 17 may be installed by the manufacturer of the field device 11, for example. The document database 17 and the maintenance and management apparatus 18 may be connected to the change detection apparatus 16 via the network 101 (e.g. the Internet or a dedicated line).

(1-8. Maintenance and Management Apparatus)

The maintenance and management apparatus 18 supports maintenance and management of the facility. The maintenance and management apparatus 18 may include a device registry 1800 that stores at least unique device information and setting parameter values for each of the plurality of field devices 11. Furthermore, the maintenance and management apparatus 18 may receive the change information output by the change detection apparatus 16. The maintenance and management apparatus 18 may be a device lifecycle manager, for example, and may be realized by cloud computing, a physical server, or a PC. The maintenance and management apparatus 18 may be connected to the change detection apparatus 16 in a wired or wireless manner, via the network 101.

Conventionally, when a setting parameter is changed using a portable handheld terminal by an on-site worker, the content of the change is communicated to the manager verbally or in a written document, but this communication is not performed automatically, and therefore there are cases where information is not shared with the manager because providing the communication is forgotten due to human error or the content of the communication is incorrect. In contrast to this, with the maintenance and management system 1 according to the present embodiment, the change detection apparatus 16 automatically acquires the setting parameter values of the field devices 11, detects the presence or absence of a change, and outputs change information in response to this change having occurred. Accordingly, it is possible to accurately share information concerning the presence or absence and content of a change in a setting parameter value between the manager, the on-site worker, and the like. Therefore, it is possible to suitably perform driving control, warehouse management, maintenance, and the like of the field devices 11.

(2. Detailed Configuration of the Change Detection Apparatus)

Figure 2:
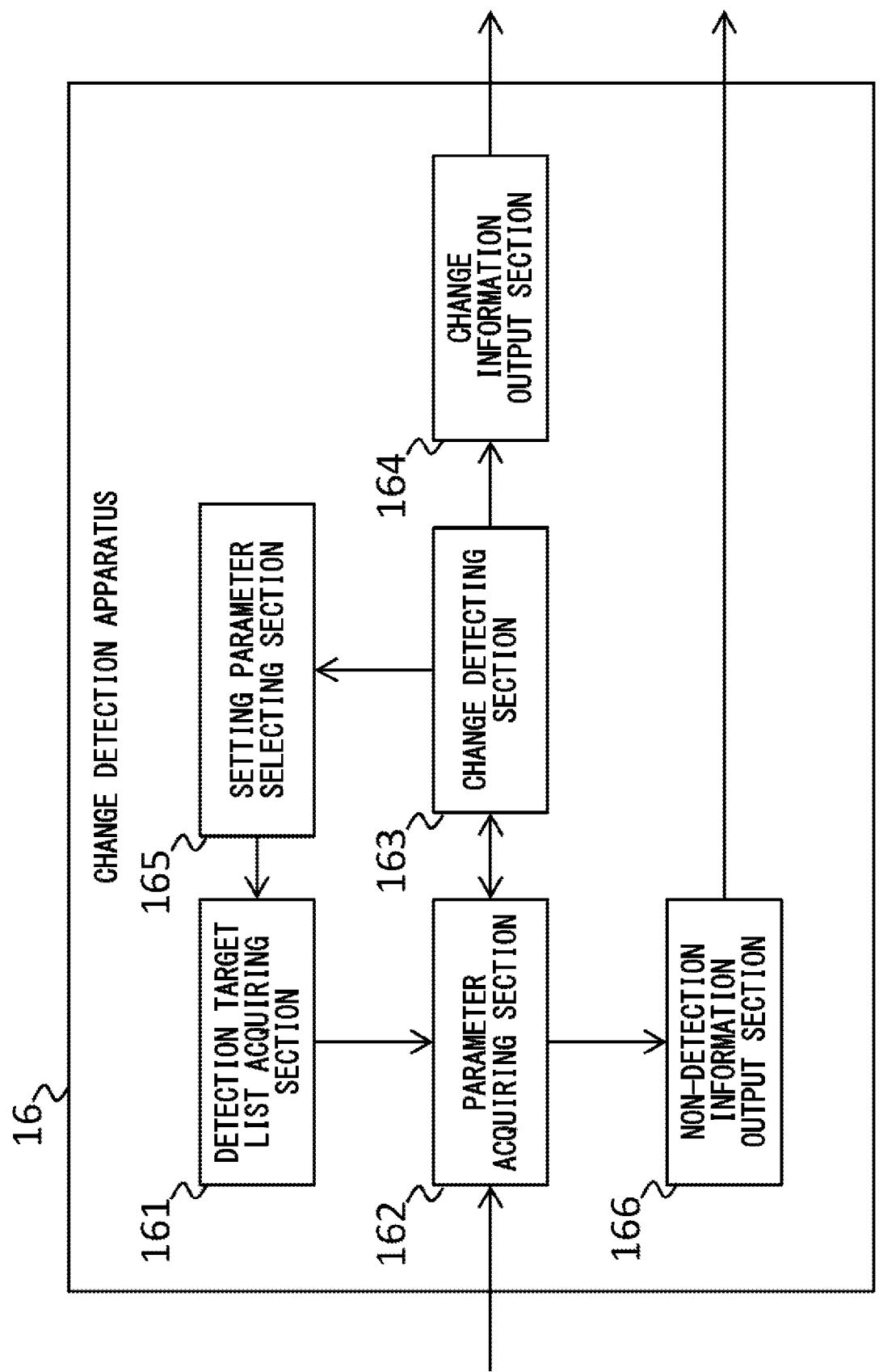
FIG. 2 shows the change detection apparatus.

FIG. 2 shows the change detection apparatus 16. The change detection apparatus 16 detects the presence or absence of a change in the setting parameter values of the field devices 11, and includes a detection target list acquiring section 161, a parameter acquiring section 162, a change detecting section 163, a change information output section 164, a setting parameter selecting section 165, and a non-detection information output section 166.

The detection target list acquiring section 161 acquires a detection target list that designates setting parameters that are change detection targets. The detection target list may include, as items for which a value change is to be detected, at least the model names of the field devices 11 and the setting parameter identification information. The detection target list includes a maximum of ten setting parameters for each model name of a field device 11, for example. The detection target list may include a maximum fixed number (e.g. ten) of setting parameters for every field device 11. In this case, each setting parameter in the detection target list may be associated with a field device 11 having a different model name, or at least some, e.g. two or more, of the setting parameters may be associated with a field device 11 having the same model name. The detection target list may be created by the manager. For example, the manager may create the detection target list to include setting parameters that can be set by the on-site worker when performing maintenance or startup of the field devices 11. The detection target list may include, instead of model names, combinations of device types (identifiers of device types (flow meter, pressure transmitter, or the like) and device revisions (identifiers of versions of the specifications of devices or the like).

The detection target list acquiring section 161 may acquire the detection target list in response to an input manipulation made to the change detection apparatus 16, or may acquire the detection target list by communicating with an external apparatus (e.g. the maintenance and management apparatus 18). In addition to this, the detection target list acquiring section 161 may update the detection target list by adding setting parameters selected by the setting parameter selecting section 165 described further below along with model names of the corresponding field devices 11 sequentially to the change detection targets or by replacing existing detection targets. When adding a new setting parameter to the detection target list, the detection target list acquiring section 161 may maintain or increase the number of setting parameters in the list. The detection target list acquiring section 161 may supply the parameter acquiring section 162 with the detection target list.

The parameter acquiring section 162 acquires at least one setting parameter value of a field device 11. For example, the parameter acquiring section 162 may acquire each value of the setting parameters included in the detection target list, among a plurality of setting parameters of the plurality of field devices 11. The parameter acquiring section 162 may acquire the value of each setting parameter included in the detection target list from each field device 11 whose model name is associated with this setting parameter. The parameter acquiring section 162 may acquire the setting parameter value every predetermined time interval (e.g. one day or one week). The parameter acquiring section 162 supplies the acquired setting parameter values to the change detecting section 163 and the non-detection information output section 166.

Furthermore, the parameter acquiring section 162 may acquire at least the unique device information and the setting parameter values from new field devices 11 that are newly connected to the control network 100. The parameter acquiring section 162 may detect new field devices 11 every predetermined time interval (e.g. one day or one week). For example, the parameter acquiring section 162 may detect new field devices 11 using a plug and play function. The parameter acquiring section 162 may supply the acquired unique device information, setting parameter values, and the like to the change information output section 164 via the change detecting section 163.

The change detecting section 163 detects whether a setting parameter value has been changed. The change detecting section 163 may supply the presence or absence of a change to the change information output section 164, the parameter acquiring section 162, and the setting parameter selecting section 165.

The change information output section 164 outputs the change information in response to a change in a setting parameter value having been detected. For example, the change information output section 164 may transmit change information to the maintenance and management apparatus 18 for each of the plurality of field devices 11. Information (a flag or the like) indicating that a change has been detected is included in the change information, and in addition to this information, the change information may include the setting parameter value after the change and device identification information of the corresponding field device 11. Furthermore, the change information may include a date and time at which the change was detected. If a change in the setting parameter values is not detected, the change information output section 164 may transmit information (a flag or the like) indicating that a change was not detected to the maintenance and management apparatus 18, and may transmit, in addition to this information, the unchanged setting parameter value and the device identification information of the corresponding field device 11.

Furthermore, when the unique device information, setting parameter values, and the like of a new field device 11 are supplied from the parameter acquiring section 162, the change information output section 164 may transmit to the maintenance and management apparatus 18 a registration request for registering these pieces of information in the device registry 1800.

The setting parameter selecting section 165 selects the setting parameters to be change detection targets, based on the frequency of change of each of the plurality of setting parameters. The setting parameter selecting section 165 may supply the selected setting parameters to the detection target list acquiring section 161, to update the detection target list.

When it is detected that the parameter acquiring section 162 cannot detect a field device 11 and cannot acquire the setting parameter value from this field device 11, the non-detection information output section 166, in response to this detection, outputs non-detection information indicating that the field device 11 is not detected. A situation in which the setting parameter value cannot be acquired can occur when the field device 11 is removed from the control network 100 by the on-site worker, when the field device 11 is not removed but is unable to communicate due to a malfunction or the like therein, and the like. The non-detection information may include the unique device information of the field device 11. The non-detection information output section 166 may output the non-detection information to the maintenance and management apparatus 18.

According to the change detection apparatus 16 above, since the change information is transmitted to the maintenance and management apparatus 18, it is possible to perform unified management, with the maintenance and management apparatus 18, of the content of the unique device information and the setting parameters of each of the plurality of field devices 11.

Furthermore, since the setting parameters included in the detection target list, among the plurality of setting parameters of the plurality of field devices 11, are set as the change detection targets, the amount of information being communicated can be restricted compared to a case where values of all of the setting parameters are acquired. This is particularly effective in a case where the communication of data used for control has higher priority than the communication of the values of setting parameters relating to maintenance in the field devices 11 controlled by the driving control apparatus 13, and there is a desire to restrict the amount of information involved in the communication of setting parameter values. By including the important setting parameters in the detection target list, it is possible to detect changes therein at an early stage.

Furthermore, since the setting parameters to be the change detection targets are selected based on the frequency of the change of each setting parameter, it is possible to reliably detect changes in setting parameters that are frequently changed when the field devices 11 are actually operated in a plant, for example.

Furthermore, the setting parameter values are acquired at predetermined time intervals. Since changes in the setting parameters do not constantly occur but instead occur during maintenance work that is performed periodically or as necessary, it is possible to automatically detect the change as soon as possible after the change occurs, by repeatedly acquiring the setting parameter values and detecting change at predetermined intervals.

Furthermore, since the unique device information and the setting parameter values of a new field device 11 that is newly connected are acquired and registered in the device registry 1800, it is possible to detect change in the setting parameter values for the newly attached field device 11, and also to automatically register this information of the new field device 11 and change in the setting parameter values of the new field device 11 in the device registry 1800. Furthermore, when a field device 11 is removed by the on-site worker for inspection, replacement, or the like, the non-detection information is output to the maintenance and management apparatus 18 by the non-detection information output section 166, and therefore the situation at the site can be shared with the manager.

(2-1. Detection Target List)

FIG. 3 shows a detection target list. As an example in the present embodiment, the detection target list includes the model name and product name of each field device 11, the setting parameter identification information, and supplementary information. The setting parameter identification information includes a number of the setting parameter that is the detection target for each field device 11 model name, a code and a name for identifying the setting parameter, and an explanation of the content of the setting parameter. The supplementary information includes a description of the advantages for a user (e.g. the on-site worker or manager) of the maintenance and management system 1 obtained by detecting the change in the setting parameter value. It should be noted that the description of the content of the setting parameter and the supplementary information do not need to be included in the detection target list.

Here, in the detection target list shown in this drawing, the setting parameter having the code "J10" is designated as a change detection target for the field device 11 having the model name "AAA010" and the product name "differential pressure transfer machine". This setting parameter is for setting an adjustment amount. As an example, the field device 11 stores therein an adjustment amount acquired by performing an automatic zero-point adjustment, and outputs a value obtained by subtracting this adjustment amount from a sensor measurement value to the driving control apparatus 13 as the process value. The adjustment amount can be changed by the maintenance terminal 12 or the like. By detecting a change in this setting parameter value, specifically by detecting that the zero-point adjustment amount has changed due to an automatic execution of a zero-point adjustment by the field device 11, a change in the setting parameter value by the maintenance terminal 12, or the like, information concerning the presence or absence and content of the change in the zero-point adjustment is accurately shared.

Furthermore, the setting parameter having the code "S00" is designated as a change detection target for the same field device 11. This setting parameter is for setting an initialization of the parameter, and by detecting a change in this value, specifically by detecting a change from a value indicating that the initialization has yet to be performed to a value indicating that the initialization has been performed, information concerning the presence or absence and content of the change in the initialization is accurately shared.

The setting parameter having the code "C10" is designated as a change detection target for the same field device 11. This setting parameter is for setting a tag name attached to the field device 11, and by detecting a change in this value, information concerning the presence or absence and content of the change in the tag name is accurately shared. The tag name does not need to be in an input state (i.e. the tag name may be blank) when the field device 11 is installed, and a change in the tag name may be detected when a prescribed tag name is input at a later date. The tag name may be an identifier for identifying the intended use of the field device 11, for example, and may be set by the manager of the maintenance and management system 1, for example.

The setting parameter having the code "D23" is designated as a change detection target for the same field device 11. This setting parameter is for setting test conditions, and sets an output value of the test output, for example. As an example, the output value, which is the setting parameter value, may be set to be any value from 0% (4 mA) to 100% (20 mA), and may be used to test whether an output value of 50% is received by the driving control apparatus 13 when the value is changed from 0% (4 mA) to 50% (12 mA). By detecting a change in this setting parameter value, information concerning the presence or absence of a test and content of the change in the output value is accurately shared.

In the detection target list in this drawing, the setting parameter having the code "B15" is designated as a change detection target for the field device 11 having the model name "BBB010" and the product name "electromagnetic flow meter". This setting parameter is used to calculate process data, and is for setting the damping timing, for example. By detecting a change in this setting parameter value, information concerning the presence or absence and content of the change in a damping coefficient is accurately shared. For example, if a process has a small amount of fluctuation in the flow rate of the fluid under measurement, the damping time (e.g. a first-order delay time constant) is changed to a value larger than the current value, and if a process has a large amount of fluctuation in the flow rate, the damping time is changed to a value smaller than the current value.

The types of setting parameters are not limited to those described above, and the setting parameter may be a constant unique to a field device 11 that is a sensor, for example. By detecting a change in this setting parameter value, information concerning the presence or absence and content of a change in the process value measurement conditions or the like is accurately shared. Furthermore, the detection target list may have another format as long as information concerning the setting parameters is arranged therein, and the detection target list does not necessarily need to have a list-type data structure. For example, the detection target list may have a format in which the model names and codes are arranged in association with each other.

(3. Detailed Configuration of the Maintenance and Management Apparatus)

Figure 4:
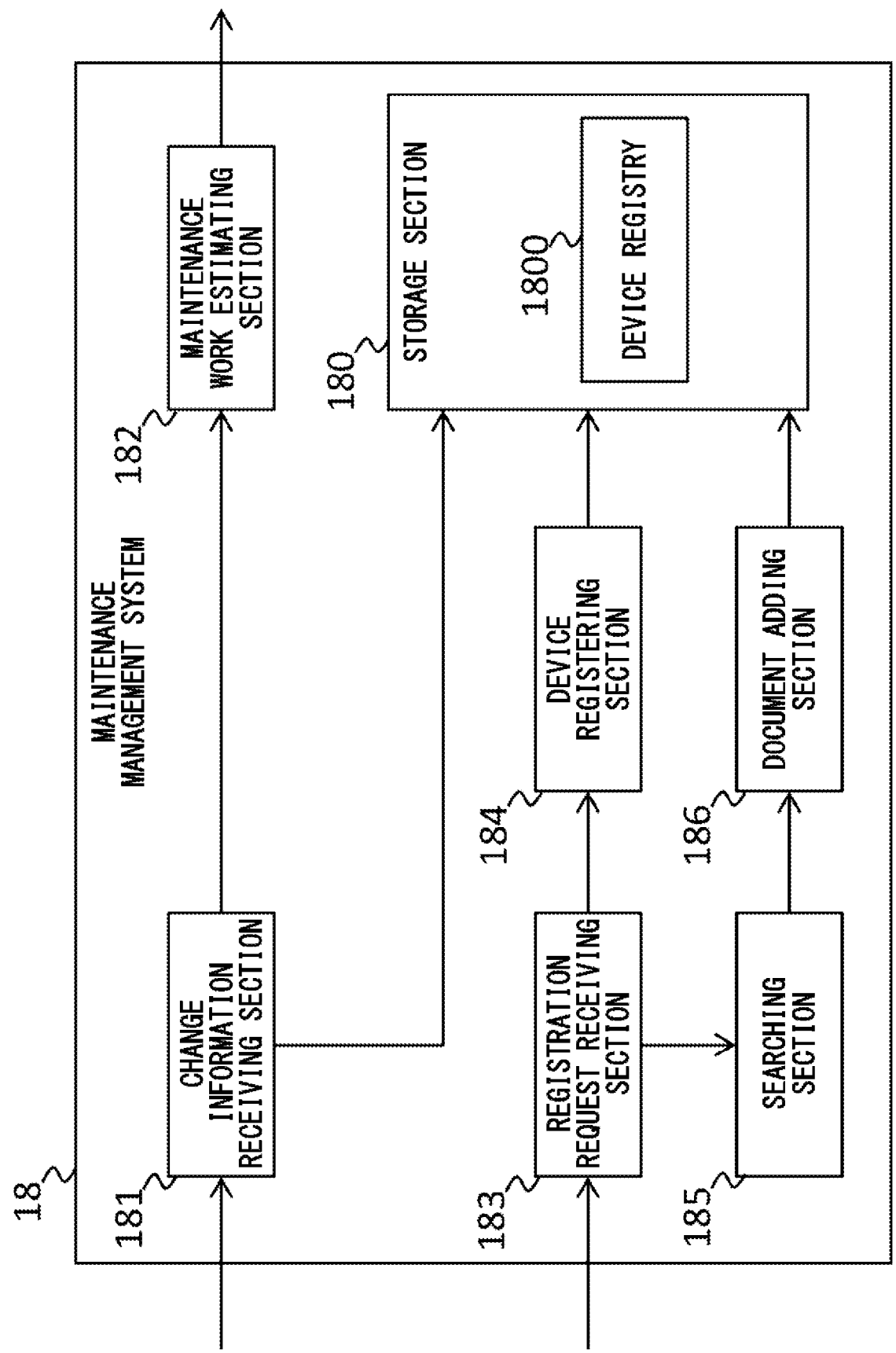
FIG. 4 shows the maintenance and management apparatus.

FIG. 4 shows the maintenance and management apparatus 18. The maintenance and management apparatus 18 may include a storage section 180, a change information receiving section 181, a maintenance work estimating section 182, a registration request receiving section 183, a device registering section 184, a searching section 185, and a document adding section 186. However, the maintenance work estimating section 182 does not need to be included in the maintenance and management apparatus 18.

The storage section 180 stores the device registry 1800. The device registry 1800 may store a setting parameter value history, in association with the unique device information of each field device 11. Instead, the device registry 1800 may store only the newest setting parameter values in association with each piece of unique device information.

The change information receiving section 181 receives the change information output from the change information output section 164. The change information receiving section 181 may update the device registry 1800 according to the received change information. The update may include overwriting the setting parameter values with the changed values, saving the changed values as the history, or overwriting the date and time of the change. In this way, when a setting parameter value is changed, the device registry 1800 can be automatically updated with the changed information. Furthermore, the change information receiving section 181 may supply the received change information to the maintenance work estimating section 182.

Furthermore, the change information receiving section 181 may receive the non-detection information output from the non-detection information output section 166. The change information receiving section 181 may update the device registry 1800 according to the received non-detection information. For example, the change information receiving section 181 may detect the unique device information of the non-detection information using the device registry 1800, and register that the field device 11 is not detected in the control network 100 in association with this unique device information.

The maintenance work estimating section 182 estimates the maintenance work performed on the field device 11, in response to a setting parameter value having changed. The maintenance work estimating section 182 may estimate the maintenance work using estimation rules in which each setting parameter is associated with maintenance work that should have been performed on the field device 11 when the value of this setting parameter changed. The setting rule may be created and suitably updated by the manager, by analyzing a record of past maintenance and the change history of the setting parameters. The maintenance work estimating section 182 may estimate the maintenance work associated with the setting parameter included in the change information from the change information receiving section 181, according to the estimation rule, as the maintenance work performed on the field device 11. The maintenance work estimating section 182 may display information concerning the estimated maintenance work in a display apparatus (not shown in the drawings) of the maintenance and management apparatus 18.

The registration request receiving section 183 receives the registration request output from the change information output section 164. The registration request receiving section 183 may supply the received registration request to the device registering section 184 and the searching section 185.

The device registering section 184 registers the new field device 11 in the device registry 1800, in response to receiving the registration request. For example, the device registering section 184 registers the unique device information and the setting parameter value included in the registration request in the device registry 1800, in association with each other. In this way, when the registration request is received, it is possible to automatically register the information of the new field device 11.

The searching section 185 searches the document database 17 for any document relating to the field device 11, using the unique device information of this field device 11. The field device 11 whose related document is searched for may be a field device 11 that is newly connected to the control network 100, or may be a field device 11 that is already connected and registered in the device registry 1800. The searching section 185 may supply the document adding section 186 with the document searched for in and acquired from the document database 17.

The document adding section 186 adds the document searched for and acquired by the searching section 185 from the document database 17 to the device registry 1800, in association with the field device 11. In this way, there is no need to find a physical paper document relating to the new field device 11, and therefore it is possible to easily check the document and then perform maintenance.

(3-1. Device Registry)

FIG. 5 shows the device registry 1800. As an example in the present embodiment, the device registry 1800 includes the unique device information, setting parameter values, specification information, and document numbers of the field devices 11 as items. The unique device information includes the device ID that is a serial number provided to the field device 11 by the communication protocol, the serial number set by a manufacturer of the field device 11, the model name, the manufacturer name, the product name, and the tag name that is set by the manager as items. Items such as the current status, installation position, functional role (e.g. analog input, analog output, or the like), material name, and the like of the field devices 11 may be included in the device registry 1800. The setting parameter includes the history of the setting values of each setting parameter of the field device 11. The specification information includes specifications of the field device 11. The document number indicates the number of the document relating to the field device 11. For example, the document number may be a file name of a document stored inside the maintenance and management apparatus 18, or a combination of the save destination (URL name or the like) of the document and the file name of the document.

(3-2. Estimation Rule)

FIG. 6 shows estimation rules. Each estimation rule associates a setting parameter with the maintenance work that should have been performed on this field device 11 when this setting parameter value changed. For example, in the estimation rules of this drawing, the maintenance work of "TUNING" is associated with the setting parameter of "DAMPING" for setting the damping time. For example, tuning may include changing the damping time according to the magnitude of the fluctuation of the flow rate of the fluid under measurement, to adapt this damping time to the state of the flow rate. One type of maintenance work or a plurality of types of maintenance work may be associated with one setting parameter. When the on-site worker installs a new field device 11, there are cases where incidental work such as shipping the field device 11, updating an inventory list, or the like is performed in addition to the installation work. The maintenance work may include such incidental work.

(4. Operation of the Maintenance and Management System)

(4-1. Operation when a Setting Parameter has been Changed)

Figure 7:
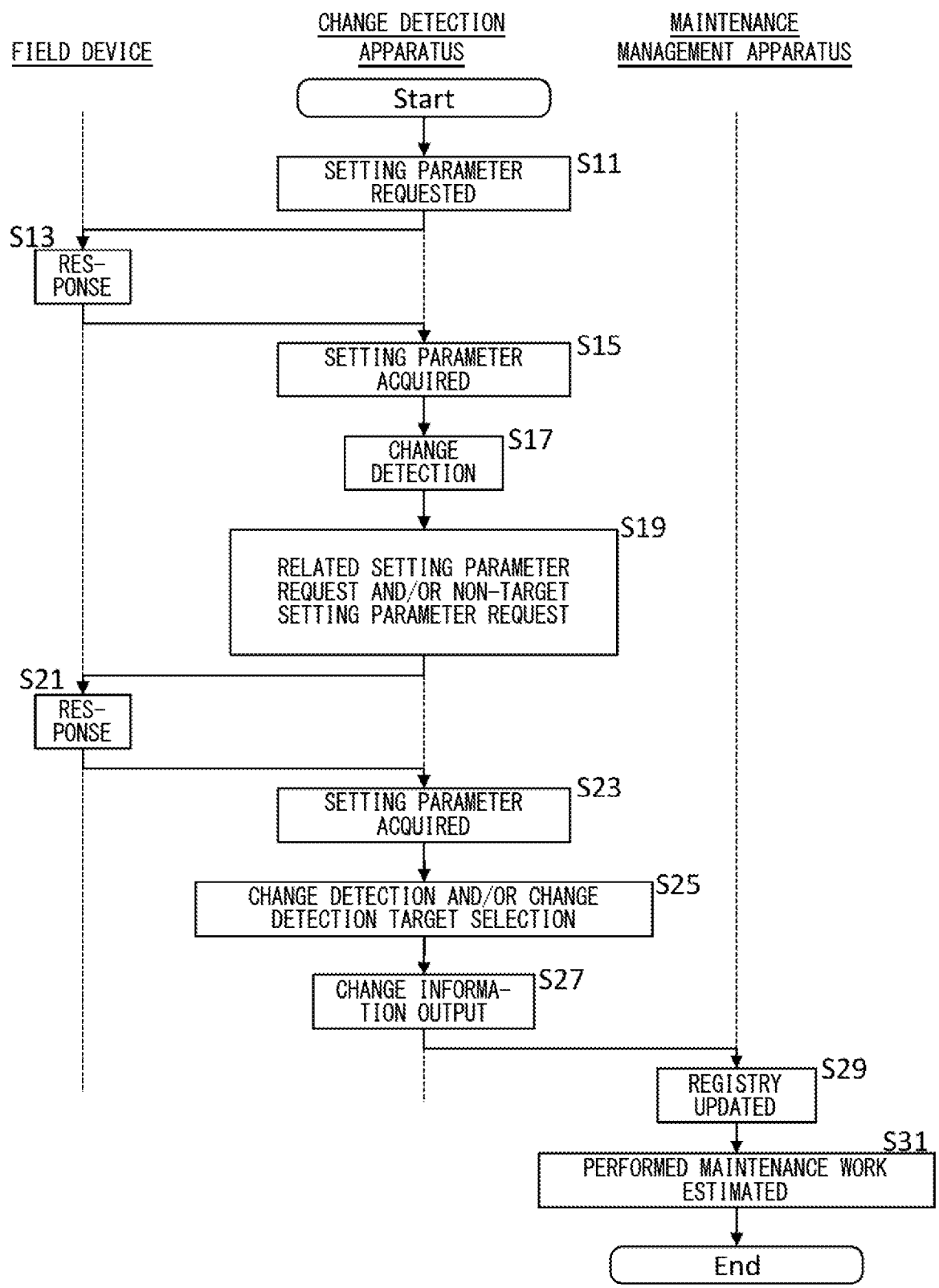
FIG. 7 shows the operation of the maintenance and management system in a case where a setting parameter value of a field device has been changed.

FIG. 7 shows the operation of the maintenance and management system 1 in a case where a setting parameter value of a field device 11 has been changed. The maintenance and management system 1 registers the setting parameter value change in the device registry 1800, by performing the processes of steps S11 to S31. As an example, this operation may be performed every predetermined time interval.

At step S11, the parameter acquiring section 162 of the change detection apparatus 16 makes a request for the setting parameter value to the field device 11. For example, the parameter acquiring section 162 makes a request for each setting value of the plurality of setting parameters included in the detection target list, respectively to the field devices 11 having model names associated with these setting parameters. As an example, a table in which the model names of the field devices 11 and the serial numbers provided to the field devices 11 by the communication protocol are associated with each other may be stored inside the change detection apparatus 16, and the parameter acquiring section 162 may reference this table to request the setting parameter values from these field devices 11.

Next, at step S13, each field device 11 that received a request for a setting parameter value transmits the requested setting parameter value to the change detection apparatus 16. Each field device 11 may transmit the setting parameter value in association with its own unique device information. The field devices 11 may transmit the setting parameter values to the change detection apparatus 16 via the driving control apparatus 13.

Next, at step S15, the parameter acquiring section 162 of the change detection apparatus 16 acquires the unique device information and the setting parameter value from each field device 11. The parameter acquiring section 162 may acquire the unique device information and the setting parameter values within a reference time (e.g. one minute) from when step S11 was performed.

Next, at step S17, the change detecting section 163 of the change detection apparatus 16 detects whether a setting parameter value has been changed. For example, the change detecting section 163 may detect that a setting parameter value has been changed in response to a setting parameter value that is newly acquired (e.g. in the current acquisition) not being equal to the setting parameter value acquired earlier (e.g. one acquisition earlier than the current acquisition). The change detecting section 163 may detect whether the setting parameter value has been changed for each field device 11, i.e. for each piece of unique device information. At least the previous setting parameter value (the history of the setting parameter values acquired each time in the past, as an example in the present embodiment) acquired by the parameter acquiring section 162 may be stored within the change detection apparatus 16, and the change detecting section 163 may use this stored content to detect a change. In the present embodiment, a case is described in which a value among the plurality of acquired setting parameter values has been changed. If none of the plurality of acquired setting parameter values have changed, the maintenance and management system 1 may end the process without performing the operations of step S19 and onward, or may transmit the unique device information and information indicating that change was not detected to the maintenance and management apparatus 18, and then end the process.

Next, at step S19, the parameter acquiring section 162 requests the value of a related setting parameter that is related to a setting parameter in the detection target list, from a field device 11, in response to a change in the setting parameter value having been detected. For example, in response to a change in one setting parameter value having been detected, the parameter acquiring section 162 may request the value of the related setting parameter related to this one setting parameter. The related setting parameter may be a setting parameter that can be changed along with the one setting parameter. For example, in a case where the one setting parameter is an upper limit value of a measurement range of a field device 11 serving as a sensor, the related setting parameter may be a lower limit value of the measurement range. The related setting parameter may be another setting parameter for the field device 11 with the same model name as the field device 11 having the one setting parameter, or may be a setting parameter for a field device 11 with a different model name than the field device 11 having the one setting parameter. The parameter acquiring section 162 may hold a table in which at least one setting parameter (e.g. each setting parameter in the detection target list), a related setting parameter related to the at least one setting parameter, and the model name of the field device 11 having the related setting parameter are associated with each other, and may reference this table to transmit the request for the related setting parameter value to this field device 11.

In addition to or instead of this, the parameter acquiring section 162 requests values of a plurality of setting parameters (also referred to as non-target setting parameters) that are not included in the detection target list, in response to a change having been detected in any setting parameter value in the detection target list. For example, in response to a change having been detected in at least one setting parameter in the detection target list, the parameter acquiring section 162 may request each setting parameter value of each field device 11, i.e. all of the setting parameter values of the field devices 11.

Next, at step S21, the field device 11 from which the setting parameter value was requested transmits the requested setting parameter value to the change detection apparatus 16, in the same manner as in step S13.

Next, at step S23, the parameter acquiring section 162 of the change detection apparatus 16 acquires the unique device information from the field device 11 and the related setting parameter value or the non-target setting parameter value. The parameter acquiring section 162 may acquire the unique device information and the related setting parameter value or the non-target setting parameter value within a reference time from when step S19 was performed.

Next, at step S25, the change detecting section 163 of the change detection apparatus 16 detects whether the related setting parameter value or the non-target setting parameter value has been changed, in the same manner as in step S17 above.

Furthermore, the setting parameter selecting section 165 selects a setting parameter to be a change detection target, based on the frequency of change of each setting parameter, and updates the detection target list within the detection target list acquiring section 161. For example, the setting parameter selecting section 165 may select the setting parameter based on the frequencies of change of the setting parameters in the detection target list and the related setting parameter or the non-target setting parameter. As an example, by calculating the change frequencies based on the detection results of the change detecting section 163 and relating the change frequencies to the setting parameters, the setting parameter selecting section 165 may select the setting parameter whose change frequency is ranked above a reference ranking among a plurality of setting parameters for each field device 11 model name. Furthermore, if the frequency of change of one setting parameter is greater than a reference frequency, the setting parameter selecting section 165 may select this one setting parameter. The setting parameter selecting section 165 may add the selected setting parameter to the detection target list or, if the number of detection target parameters is limited, may change a setting parameter whose change frequency is low to a setting parameter whose change frequency is high. In this way, by having the manager set the detection target list before operation of the field devices 11 and then starting the operation, and including a setting parameter in the detection target list if this setting parameter has a high change frequency and was not included in the detection target list due to the operating state, it is possible to update the detection target list in accordance with operation of the field devices 11 and to detect changes of setting parameter values in the list.

The update of the detection target list does not need to be performed every time the process of step S25 is performed, and may be performed every predetermined time interval (e.g. three months). Furthermore, the maintenance and management system 1 does not need to perform the processes of steps S19 to S25.

Next, at step S27, the change information output section 164 outputs the change information. If the parameter acquiring section 162 has acquired a related setting parameter value, the change information output section 164 may output change information including this related setting parameter value. If the parameter acquiring section 162 has acquired a non-target setting parameter value, the change information output section 164 may output change information including this non-target setting parameter value.

Next, at step S29, the change information receiving section 181 of the maintenance and management apparatus 18 receives the change information and updates the device registry 1800. The change information receiving section 181 may display the setting parameter value before and after the update along with the unique device information, in a display apparatus of the maintenance and management apparatus 18.

Then, at step S31, the maintenance work estimating section 182 estimates the maintenance work associated, according to the estimation rule, with the setting parameter included in the change information as the maintenance work that was performed on the field device 11, and displays this maintenance work in the display apparatus of the maintenance and management apparatus 18. In this way, it is possible to share the information concerning the maintenance work performed on the field device 11 between the manager and the on-site worker.

According to the operations described above, the related setting parameter value is further acquired in response to a change having been detected in the setting parameter value that is a change detection target, and change information including the related setting parameter value is output, and therefore, compared to a case where the related setting parameter value is acquired every time in addition to the setting parameter that is a detection target, it is possible to detect change in the related setting parameter value as well, while also restricting the amount of information that is communicated. Furthermore, there are cases where, due to the processing of the measurement target, the upper limit value and lower limit value of the measurement range are linked to each other, such that when one of the setting parameter values (upper limit value) changes, the other setting parameter value (lower limit value) also changes. In such a case, it is possible to acquire the value of the other setting parameter related to the one setting parameter along with the one setting parameter value, and to detect change in this other setting parameter value.

Furthermore, the non-target setting parameter value is further acquired in response to a change having been detected in any setting parameter value that is a change detection target, and change information including the non-target setting parameter value is output, and therefore, compared to a case where all of the setting parameter values are acquired every time, it is possible to detect change in the non-target setting parameter value as well, while also restricting the amount of information that is communicated. In this way, in a case where there is a desire to check each setting parameter value in detail and to also check another setting parameter (non-target setting parameter) in response to a change having occurred in a detection target parameter, it is possible to automatically acquire the other setting parameter value and detect the change thereof (4-2. Operation when a Field Device Cannot be Detected)

Figure 8:
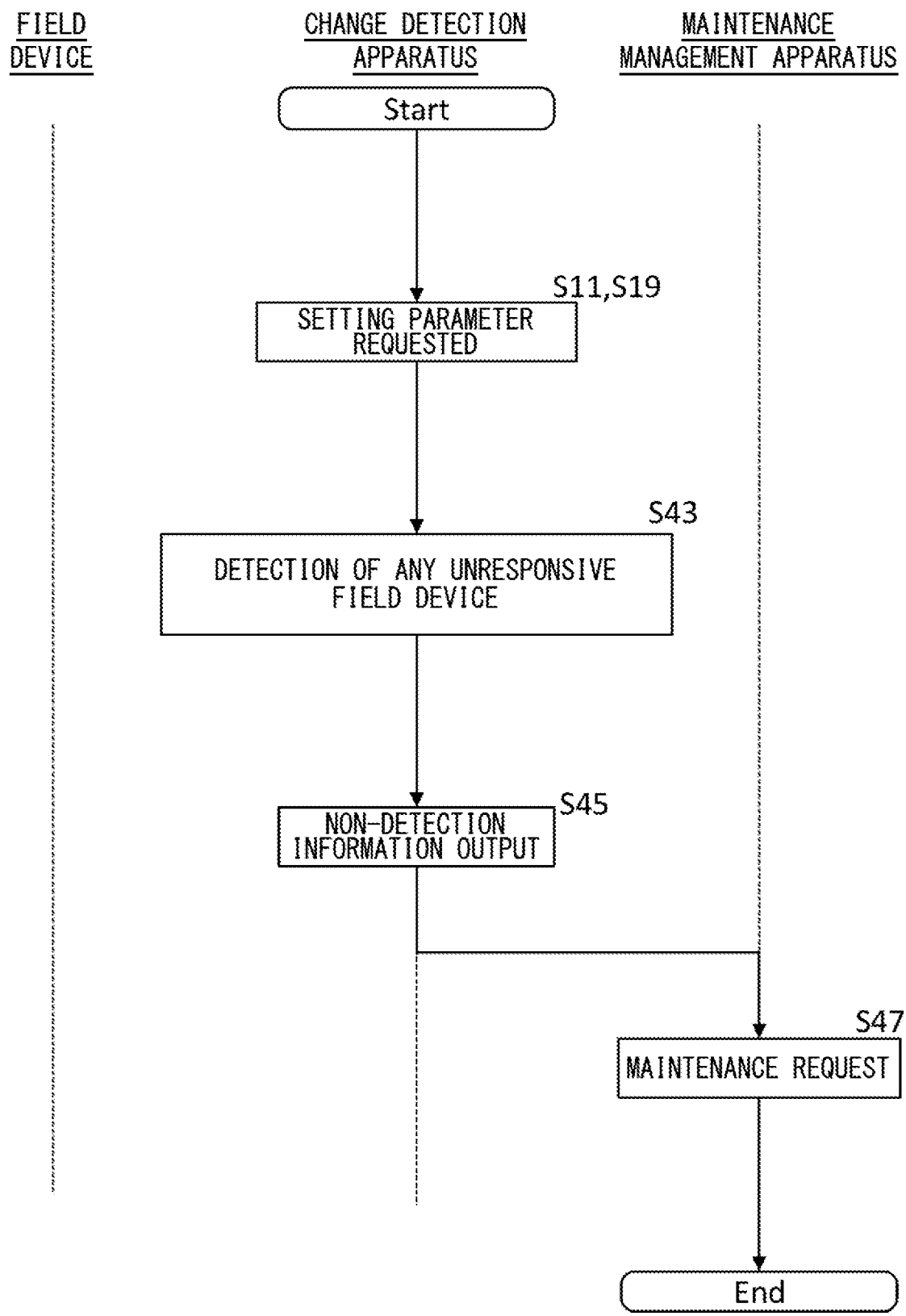
FIG. 8 shows the operation of the maintenance and management system in a case where a field device cannot be detected in the control network.

FIG. 8 shows the operation of the maintenance and management system 1 in a case where a field device 11 cannot be detected in the control network 100. The maintenance and management system 1 registers a non-detected field device 11 in the device registry 1800, by performing the processes of steps S43 to S47. As an example, this operation is performed in a case where a request for a setting parameter value is made in at least one of step S11 and step S19 described above, but a response cannot be acquired.

First, at step S43, the parameter acquiring section 162 detects whether there is a field device 11 from which a response was not acquired within a reference time from when the process of step S11 or step S19 described above was performed.

Next, at step S45, the non-detection information output section 166 acquires the unique device information of the non-detected field device 11 from the parameter acquiring section 162, and outputs non-detection information indicating that this field device 11 is not detected to the maintenance and management apparatus 18. For example, the non-detection information output section 166 may include, in the non-detection information, the unique device information of the field device 11 that did not respond, from among the pieces of unique device information of the field devices 11 to which setting parameter value requests were made at step S11 or step S19.

Next, at step S47, the change information receiving section 181 of the maintenance and management apparatus 18 receives the non-detection information and displays a message prompting maintenance for the non-detected field device 11, in a display apparatus of at least one of the maintenance and management apparatus 18 and the maintenance terminal 12. For example, the change information receiving section 181 may display the unique device information of the non-detected field device 11 and a message prompting an inspection to discover if the field device 11 has been removed or if communication failure has occurred due to a malfunction of this field device 11.

In addition to or instead of this, the change information receiving section 181 may update the device registry 1800 according to the received non-detection information. For example, the change information receiving section 181 may detect the unique device information of the non-detection information in the device registry 1800, and record in the device registry 1800 information that the field device 11 is not detected in the control network 100, in association with this unique device information.

According to the operation described above, the non-detection information is output in response to being unable to acquire a setting parameter value, and therefore it is possible to detect a malfunction of a field device 11 at an early stage. Furthermore, it is possible to reliably share information indicating that the field device 11 has been stopped for maintenance, between the manager and the on-site worker. Accordingly, it is possible to suitably perform operational control, maintenance, and the like of the field device 11.

(4-3. Operation when a Field Device is Newly Connected)

Figure 9:
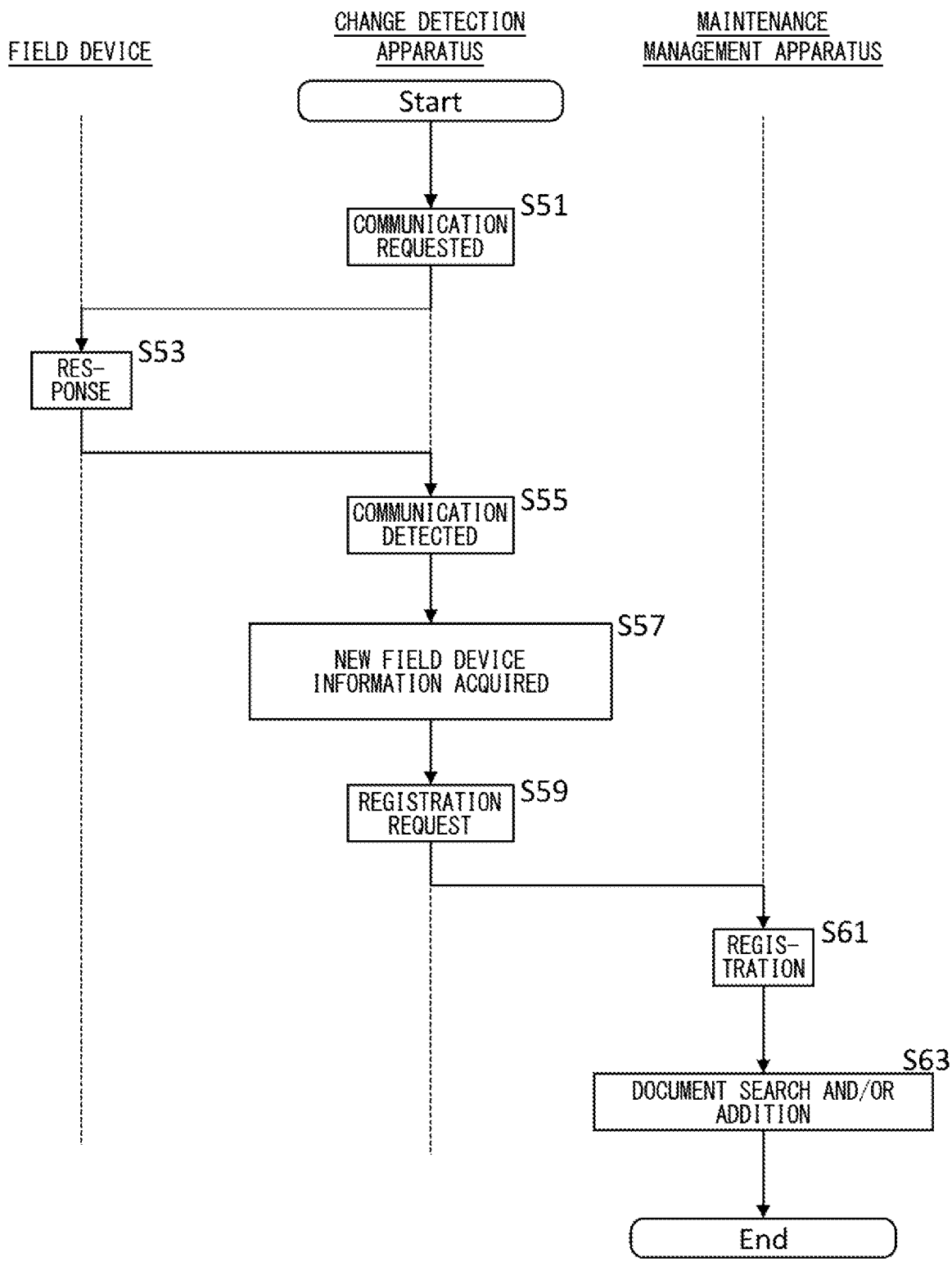
FIG. 9 shows the operation of the maintenance and management system in a case where a field device is newly connected to the control network.

FIG. 9 shows the operation of the maintenance and management system 1 in a case where a field device 11 is newly connected to the control network 100. The maintenance and management system 1 registers a new field device 11 in the device registry 1800 by performing the processes of steps S51 to S63. As an example, this operation may be performed every predetermined time interval. In addition to or instead of this, this operation may be performed in response to manipulation by the manager who has received notification that a field device 11 has been newly installed, and may be performed during the performance of the operation shown in FIG. 7, for example.

First, at step S51, the parameter acquiring section 162 of the change detection apparatus 16 makes a communication request to each field device 11. For example, the parameter acquiring section 162 may execute a plug and play function in response to manipulation by the manager, to make the communication request to each field device 11, including the newly connected field device 11. In addition to or instead of this, the parameter acquiring section 162 may execute the plug and play function to make the communication request every predetermined time interval.

Next, at step S53, each field device 11 transmits a response to the parameter acquiring section 162. This response may include the unique device information (e.g. the model name and the serial number provided to the field device 11 by the communication protocol) of the field device 11 and the setting parameter value of this field device 11.

Next, at step S55, the parameter acquiring section 162 of the change detection apparatus 16 detects communication with the field device 11. The parameter acquiring section 162 may acquire the unique device information and the setting parameter value of the field device 11 through the detected communication.

Next, at step S57, the parameter acquiring section 162 acquire the unique device information and the setting parameter value of the new field device 11. For example, the parameter acquiring section 162 may detect unique device information acquired from a field device 11 that was newly connected this time by comparing the pieces of unique device information acquired when the process of step S55 was performed the previous time and the pieces of unique device information acquired when the process of step S55 was performed this time, and acquire the setting parameter value associated with the new piece of unique device information. If new unique device information is not detected, the table in which the model names of the field devices 11 and the serial numbers provided to the respective field devices 11 by the communication protocol are associated with each other may be updated in the change detection apparatus 16, according to the communication between the parameter acquiring section 162 and the field device 11. In this way, the setting parameter value is requested from the new field device 11 at step S11 or step S19 above.

Next, at step S59, the change information output section 164 of the change detection apparatus 16 outputs a registration request for registering the unique device information and the setting parameter value of the new field device 11 in the device registry 1800.

Next, at step S61, the device registering section 184 of the maintenance and management apparatus 18 registers the unique device information and the setting parameter value included in the registration request in the device registry 1800 in association with each other.

Then, at step S63, the searching section 185 searches the document database 17 for a document relating to the new field device 11, using the unique device information of this field device 11. For example, the searching section 185 may use the model name included in the unique device information in the registration request received from the registration request receiving section 183 as a search key, to search in each document database 17 for a document associated with this model name. If a document is found, the document adding section 186 adds this document to the device registry 1800 in association with the field device 11. For example, the document adding section 186 may register the found document in the device registry 1800 in association with the unique device information and the setting parameter value registered by the device registering section 184.

(5. Display Screen)

FIG. 10 shows an example of a display screen of the maintenance and management apparatus 18. The maintenance and management apparatus 18 may display a list of the field devices 11 in a display apparatus (not shown in the drawings). This list may include at least some of the information in the device registry 1800. A control section (not shown in the drawings) of the maintenance and management apparatus 18 generates the list of field devices 11 based on the information in the device registry 1800 (e.g. the information received and updated by the change information receiving section 181), and displays this list in the display apparatus. Furthermore, at least one of information of a field device 11 whose setting parameter value has been changed and information of a field device 11 that is not detected in the control network 100, among the field devices 11 displayed in each row, may be identifiably displayed in the display apparatus by having its display mode changed. As an example in the present embodiment, the information of the field device 11 (serial number 91 of RC55555) whose setting parameter value has been changed is displayed in bold characters, and the information of the non-detected field device 11 (serial number 91 of RE77777) is displayed in a shaded manner. In this way, the manager can check the catalog of devices in the list of field devices 11 and can easily identify field devices 11 that have changed among these field devices 11, and therefore the information can be accurately shared.

FIG. 11 shows another example of a display screen of the maintenance and management apparatus 18. When a field device 11 in any line is selected through an input section (not shown in the drawings) of the maintenance and management apparatus 18, from the state of FIG. 10, the control section of the maintenance and management apparatus 18 may acquire detailed information of this field device 11 from the device registry 1800 or, if necessary, an external database in response to this selection, and display the detailed information of the selected field device 11 in the display section. The detailed information may include content in the device registry 1800 for the selected field device 11 and the history of the setting parameter values. The setting parameter history in this drawing shows that the setting parameter values in the bottom three rows have changed. In this way, the manager can check a catalog of the detailed information and detailed setting parameter history of the field devices 11, and therefore detailed information can also be accurately shared.

The product information, documents, and the like of the field devices 11 may be selectively displayed in this display screen, in response to a manipulation by the manager. The product information may include the manufacturing data, communication protocol, and the like of the field device 11, and the documents may include information concerning the documents registered in the device registry 1800.

(6. Modifications)

In the embodiment described above, the detection target list is described as including the model names and the setting parameter identification information of the field devices 11, but may include the unique device information instead of the model names of the field devices 11. In this case, the parameter acquiring section 162 of the change detection apparatus 16 may acquire the setting parameter value included in the detection target list from the field device 11 whose unique device information is associated with this setting parameter.

Furthermore, the parameter acquiring section 162 is described as having a plug and play function, but the resource management apparatus 15 or the maintenance and management apparatus 18 may have this function instead. In this case, the parameter acquiring section 162 may acquire the unique device information of a new field device 11 using the unique device information supplied to the change detection apparatus 16 that is acquired by the resource management apparatus 15 or the maintenance and management apparatus 18 in the process of step S51, S55, or S57 using the plug and play function.

The detection target list is described as being created by the manager, but may instead be created by the parameter acquiring section 162, the change detecting section 163, and the setting parameter selecting section 165. For example, the parameter acquiring section 162 and the change detecting section 163 may acquire each setting parameter of each field device 11 (e.g. all of the setting parameters) and detect the presence or absence of changes, during a predetermined time period (e.g. one month). Then, the setting parameter selecting section 165 may calculate the change frequency of each setting parameter value based on the detection results concerning the presence or absence of changes, and generate the detection target list by including changes of setting parameters selected based on the change frequencies during this time period in the detection target list. The generation of the detection target list may be performed every predetermined time interval (e.g. three months). For example, the setting parameter selecting section 165 may generate a change detection list in which a predetermined number of setting parameters, among the setting parameters having the highest change frequencies, are change detection targets.

The parameter acquiring section 162 is described as acquiring the values of the setting parameters included in the detection target list, from among each setting parameter of each field device 11, from the field devices 11, but may instead acquire each setting parameter value from each field device 11. For example, the parameter acquiring section 162 may acquire all of the setting parameter values of the field devices 11 in the process of step S11.

The maintenance and management system 1 is described as including the maintenance terminal 12, the driving control apparatus 13, the interface apparatus 14, the resource management apparatus 15, and one or more document databases 17, but any one of these may be omitted. Furthermore, the change detection apparatus 16 is described as including the detection target list acquiring section 161, the setting parameter selecting section 165, and the non-detection information output section 166, but any one of these may be omitted. Yet further, the change detection apparatus 16 and the maintenance and management apparatus 18 may each be realized by one apparatus, may be realized by a combination of a plurality of apparatuses, or may be formed integrally as a single apparatus.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA®, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 12:
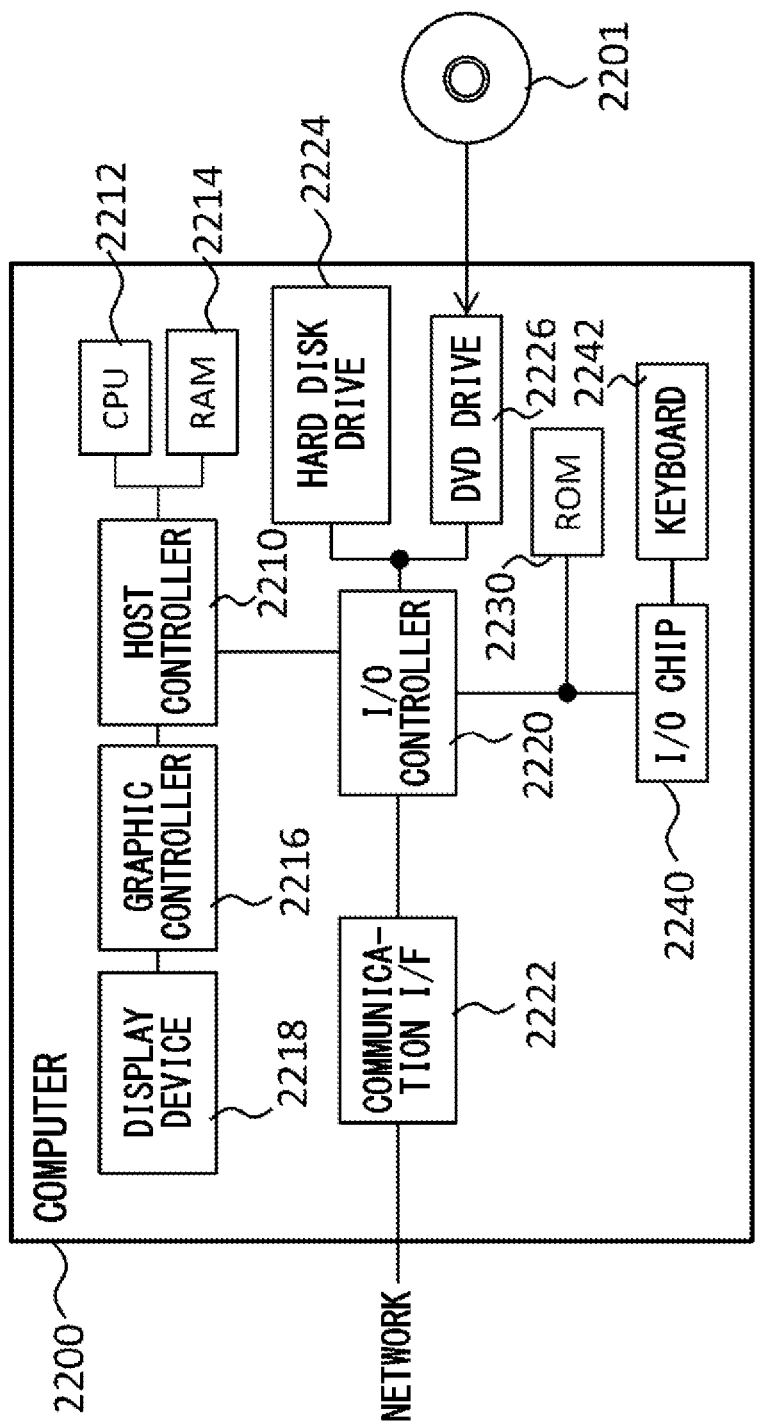
FIG. 12 shows an example of a computer in which aspects of the present invention may be wholly or partly embodied.

FIG. 12 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

1 . . . maintenance and management system; 11 . . . field device; 12 . . . maintenance terminal; 13 . . . driving control apparatus; 14 . . . interface apparatus; 15 . . . resource management apparatus; 16 . . . change detection apparatus; 17 . . . document database; 18 . . . maintenance and management apparatus; 100 . . . control network; 101 . . . network; 161 . . . detection target list acquiring section; 162 . . . parameter acquiring section; 163 . . . change detecting section; 164 . . . change information output section; 165 . . . setting parameter selecting section; 166 . . . non-detection information output section; 180 . . . storage section; 181 . . . change information receiving section; 182 . . . maintenance work estimating section; 183 . . . registration request receiving section; 184 . . . device registering section; 185 . . . searching section; 186 . . . document adding section; 1800 . . . device registry; 2200: computer, 2201: DVD-ROM, 2210: host controller, 2212: CPU, 2214: RAM, 2216: graphic controller, 2218: display device, 2220: input/output controller, 2222: communication interface, 2224: hard disk drive, 2226: DVD-ROM drive, 2230: ROM, 2240: input/output chip, 2242: keyboard

What is claimed is:

1. A change detection apparatus including a processor coupled to a memory, the change detection apparatus comprising:
a parameter acquiring section that acquires a value of at least one setting parameter of a field device, at predetermined time intervals;
a change detecting section that detects whether the value of the setting parameter has been changed; and
a change information output section that outputs change information, in response to a change in the value of the setting parameter having been detected, wherein
the parameter acquiring section, in response to a change having been detected in the value of any setting parameter that is a change detection target, further acquires values of a plurality of non-target setting parameters that are not change detection targets, and
the change information output section outputs the change information including the acquired values of the plurality of non-target setting parameters.

2. The change detection apparatus according to claim 1, wherein
the change information output section transmits the change information to a maintenance and management apparatus including a device registry that stores unique device information and the value of the setting parameter for each of a plurality of field devices, among which each field device is the field device.

3. The change detection apparatus according to claim 2, wherein
the parameter acquiring section acquires the unique device information and the value of the setting parameter of a new field device that is newly connected to a network, and
the change information output section transmits to the maintenance and management apparatus a registration request for registering the unique device information and the value of the setting parameter of the new field device in the device registry.

4. The change detection apparatus according to claim 1, further comprising:
a detection target list acquiring section that acquires a detection target list designating the setting parameter to be a change detection target, among a plurality of setting parameters of the field device, wherein
the parameter acquiring section acquires the value of the setting parameter included in the detection target list.

5. The change detection apparatus according to claim 4, further comprising:
a setting parameter selecting section that selects the setting parameters to be the change detection targets based on a frequency of change of each of the plurality of setting parameters.

6. The change detection apparatus according to claim 1, wherein
the change detecting section, in response to a newly acquired value of the setting parameter not being the same as a previously acquired value of the setting parameter, detects that the value of the setting parameter has been changed.

7. The change detection apparatus according to claim 1, wherein
the parameter acquiring section, in response to a change having been detected in the value of the setting parameter, further acquires a value of a related setting parameter that is related to the setting parameter for which this change was detected, and
the change information output section outputs the change information including the acquired value of the related setting parameter.

8. The change detection apparatus according to claim 1, further comprising:
a non-detection information output section that, in response to the field device being undetectable and the parameter acquiring section being unable to acquire the value of the setting parameter from the field device, outputs non-detection information indicating that the field device is not detected.

9. A maintenance and management system comprising:
a change detection apparatus including a processor coupled to a memory, the change detection apparatus comprising:
a parameter acquiring section that acquires a value of at least one setting parameter of a field device, at predetermined time intervals,
a change detecting section that detects whether the value of the setting parameter has been changed, and
a change information output section that outputs change information, in response to a change in the value of the setting parameter having been detected; and
a maintenance and management apparatus that includes a device registry storing unique device information and the value of the setting parameter for each of a plurality of field devices, among which each field device is the field device, and receives the change information output by the change detection apparatus, wherein the parameter acquiring section, in response to a change having been detected in the value of any setting parameter that is a change detection target, further acquires values of a plurality of non-target setting parameters that are not change detection targets, and
the change information output section outputs the change information including the acquired values of the plurality of non-target setting parameters.

10. The maintenance and management system according to claim 9, wherein the maintenance and management apparatus further includes:
a registration request receiving section that receives from the change detection apparatus a registration request for registering, in the device registry, the unique device information and the value of the setting parameter of a new field device that is newly connected to a network; and a device registering section that, in response to receiving the registration request, registers the new field device in the device registry.

11. The maintenance and management system according to claim 9, wherein the maintenance and management apparatus further includes:

a searching section that searches a document database for a document relating to the field device, using the unique device information of the field device; and a document adding section that adds the document found by the search to the device registry in association with the field device.

12. A change detection method comprising:

acquiring a value of at least one setting parameter of a field device, at predetermined time intervals;

detecting whether the value of the setting parameter has been changed; and outputting change information, in response to a change in the value of the setting parameter having been detected, wherein the parameter acquiring section, in response to a change having been detected in the value of any setting parameter that is a change detection target, further acquires values of a plurality of non-target setting parameters that are not change detection targets, and the change information output section outputs the change information including the acquired values of the plurality of non-target setting parameters.

13. A non-transitory recording medium storing thereon a program that causes a computer including a processor coupled to a memory to function as:

a parameter acquiring section that acquires a value of at least one setting parameter of a field device, at predetermined time intervals;

a change detecting section that detects whether the value of the setting parameter has been changed; and a change information output section that outputs change information, in response to a change in the value of the setting parameter having been detected, wherein the parameter acquiring section, in response to a change having been detected in the value of any setting parameter that is a change detection target, further acquires values of a plurality of non-target setting parameters that are not change detection targets, and the change information output section outputs the change information including the acquired values of the plurality of non-target setting parameters.

* * * * *